United States Patent [19]

Verseput

[11] Patent Number: 5,535,343
[45] Date of Patent: Jul. 9, 1996

[54] METHOD AND APPARATUS FOR GENERATING WRITE SIGNALS

[75] Inventor: Jerry Verseput, Folsom, Calif.

[73] Assignee: Intel Corporation, Santa Clara, Calif.

[21] Appl. No.: 207,378

[22] Filed: Mar. 7, 1994

[51] Int. Cl.⁶ .................................................. H04L 7/033
[52] U.S. Cl. ........................ 395/308; 375/359; 395/250
[58] Field of Search ................................. 395/325, 250, 395/306, 308; 365/189.01; 375/110; 307/465

[56] References Cited

U.S. PATENT DOCUMENTS

| | | | |
|---|---|---|---|
| 4,034,303 | 7/1977 | Kodaira | 328/62 |
| 5,121,480 | 6/1992 | Bonke et al. | 395/250 |
| 5,172,397 | 12/1992 | Llewellyn | 375/110 |
| 5,315,178 | 5/1994 | Snider | 307/465 |

Primary Examiner—Jack B. Harvey
Assistant Examiner—Ami Shah
Attorney, Agent, or Firm—Blakely, Sokoloff, Taylor & Zafman

[57] ABSTRACT

A write pulse generator circuit which uses first and second flip-flop circuits adapted to provide output pulses to an exclusive OR gate to generate write pulses. The circuit includes apparatus for toggling the first flip-flop in response to a rising edge of a clock pulse, and apparatus for toggling the second flip-flop in response to a falling edge of the clock pulse. By utilizing opposite phase output signals from the flip-flops, tuning of the circuit for particular operating conditions and for particular processes is eliminated.

16 Claims, 4 Drawing Sheets

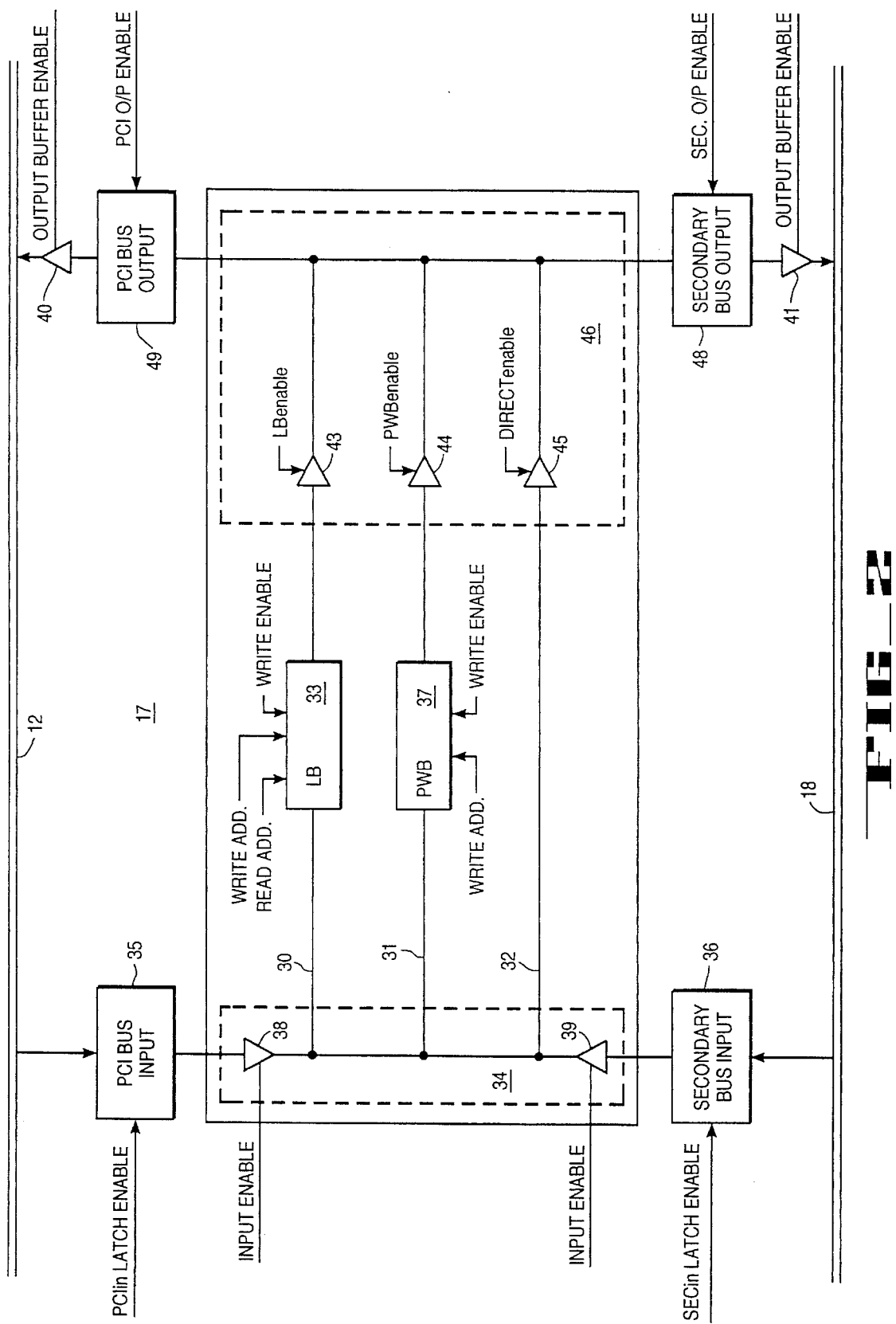
FIG_2

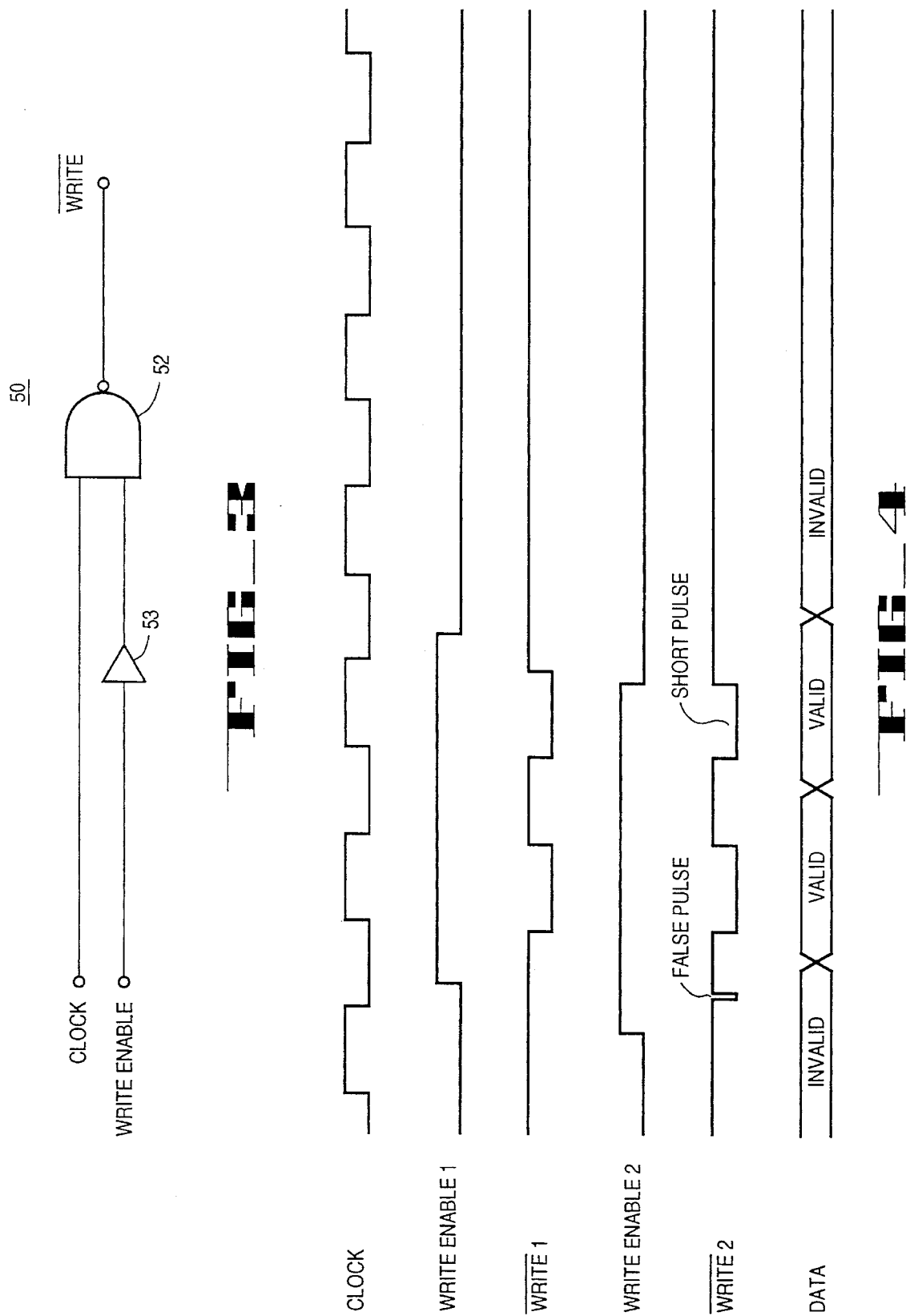

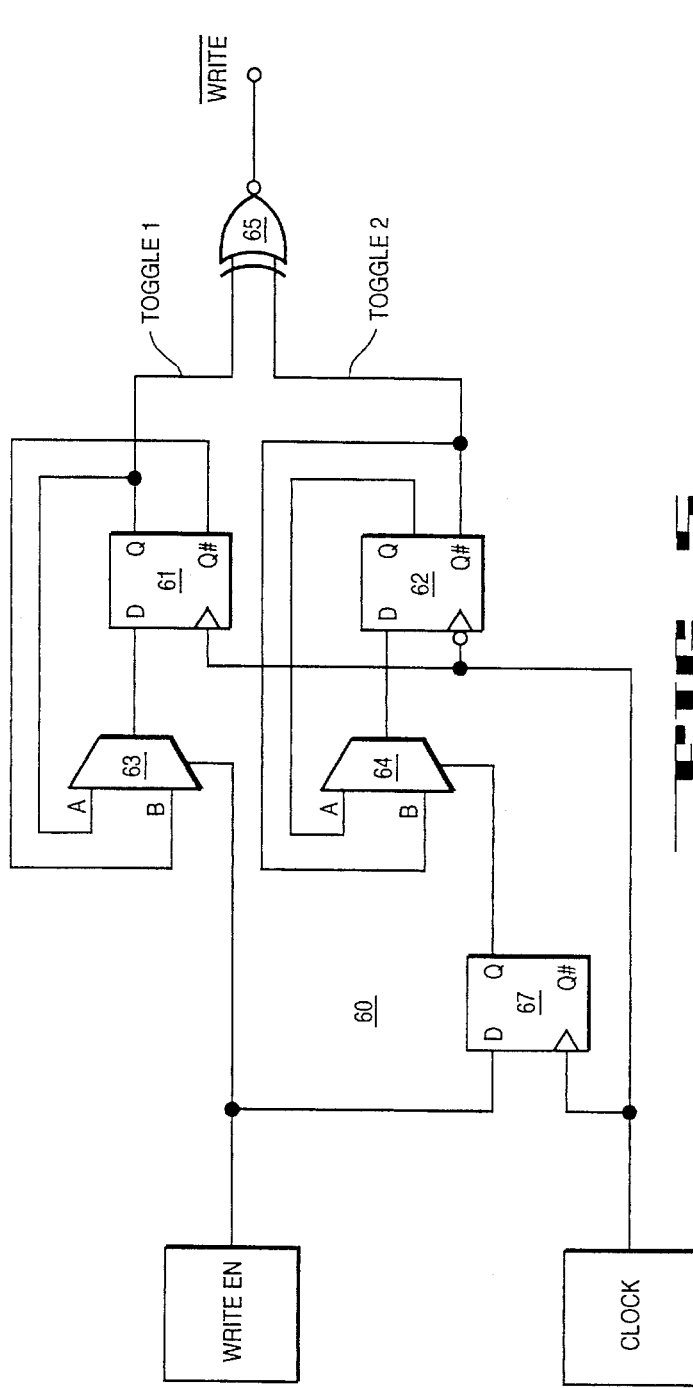
FIG_5
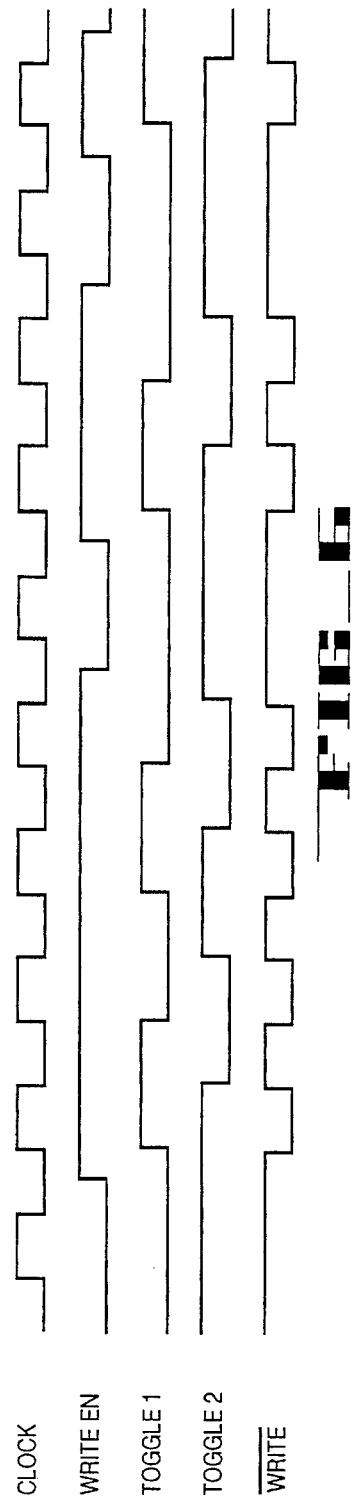
FIG_6

METHOD AND APPARATUS FOR GENERATING WRITE SIGNALS

BACKGROUND OF THE INVENTION

1. Field of the Invention

This invention relates to computer systems, and more particularly, to methods and apparatus for generating write pulses to control the writing of data to storage in a buffer memory.

2. History of the Prior Art

It is typically necessary to generate write pulses, commonly referred to as burst write pulses, at the frequency of a system clock in order to write data to cells in a memory array or other memory arrangement. Historically, such write pulses have been generated by gating clock pulses through a logic gate using a write enable signal during a period in which it is desired to provide the write pulses. This method of generating write pulses requires that the write enable signal be accurately timed with respect to the beginning and the end of individual clock pulses or unwanted write pulses may be generated. These undesirable write pulses may cause invalid data to be written to the memory cells.

In order to eliminate these undesirable write pulses, delay elements are usually placed in circuit with the clock pulses or the write enable signals in order to balance the timing of the signals at the normal operating temperature and other operating parameters of the circuitry produced by the normal manufacturing process. However, although adding such delay elements may provide a solution at particular operating parameters for circuits produced by the normal manufacturing process, it does not resolve the problem across a range of operating conditions and processes.

SUMMARY OF THE INVENTION

It is, therefore, an object of the present invention to provide an improved method and apparatus for generating burst write pulses for writing to memory cells.

It is another more specific object of the present invention to provide a method and apparatus for generating burst write pulses for the memory cells of buffer memories across a wide range of operating temperatures and processes in a manner that the pulses cannot write invalid data.

These and other objects of the present invention are realized in a write pulse generator circuit which uses first and second flip-flop circuits adapted to provide output pulses to an exclusive OR gate to generate write pulses. The circuit includes apparatus for toggling the first flip-flop in response to a rising edge of a clock pulse, and apparatus for toggling the second flip-flop in response to a falling edge of the clock pulse. By utilizing opposite phase output signals from the flip-flops tuning of the circuit for particular operating conditions and for particular processes is eliminated.

These and other objects and features of the invention will be better understood by reference to the detailed description which follows taken together with the drawings in which like elements are referred to by like designations throughout the several views.

BRIEF DESCRIPTION OF THE DRAWINGS

FIG. 2 is a block diagram of a data transfer portion of the bridge 17 illustrated in FIG. 1.

FIG. 3 is a block diagram of a prior art circuit for generating write signals which might be used in the portion of the bridge 17 illustrated in FIG. 2.

FIG. 4 is a timing diagram illustrating control signals utilized in operating the circuit of FIG. 3.

FIG. 5 is a block diagram of a circuit for providing write pulses for use in the portion of the bridge 17 illustrated in FIG. 2 in accordance with the present invention.

FIG. 6 is a series of timing diagrams illustrating control signals utilized in operating the circuit of FIG. 5.

NOTATION AND NOMENCLATURE

Figure 1:
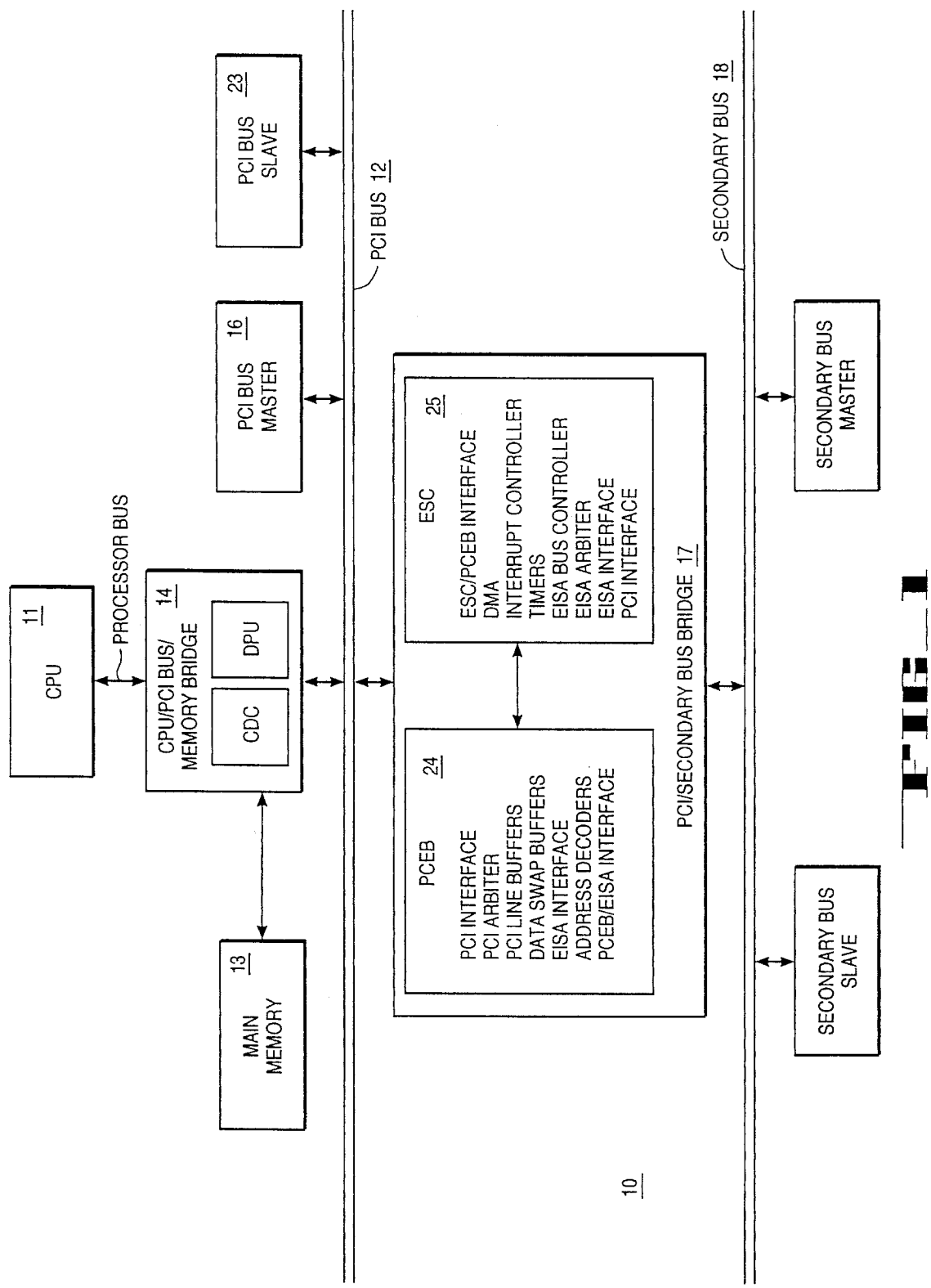
FIG. 1 is a block diagram of a computer system utilizing the present invention.

Some portions of the detailed descriptions which follow are presented in terms of symbolic representations of operations on data bits within a computer memory. These descriptions and representations are the means used by those skilled in the data processing arts to most effectively convey the substance of their work to others skilled in the art. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing the operations of the present invention include general purpose digital computers or other similar devices. In all cases the distinction between the method operations in operating a computer and the method of computation itself should be borne in mind. The present invention relates to a method and apparatus for operating a computer in processing electrical or other (e.g. mechanical, chemical) physical signals to generate other desired physical signals.

DETAILED DESCRIPTION

Referring now to FIG. 1, there is a computer system 10. The system 10 includes a central processor 11 such as an Intel i486™ or other microprocessor which carries out the various instructions provided to the computer 10 for its operations. The central processor 11 is joined to a bus 12 adapted to carry information to various components of the system 10. In the system 10 illustrated, the bus 12 is designed as a "peripheral component interconnect" (PCI) bus in order to allow the transfer of data to and from the central processor 11 at a rate faster than is possible utilizing the typical "industry standard architecture" (ISA) or "expanded industry standard architecture" (EISA) buses used by the prior art. The processor 11 is joined to the bus 12 by a bridge circuit 14 which is adapted to provide various functions necessary to the transfer. Also joined to the PCI bus 12 by the bridge circuit 14 is main memory 13 which is typically constructed of dynamic random access memory arranged in a manner well known to those skilled in the prior art to store information during a period in which power is provided to the system 10. The bridge circuit 14 may be physically constructed to include both a cache and dram controller (CDC) chip and a data path unit (DPU) chip each of which is manufactured by Intel Corporation of Santa Clara, Calif. Detailed descriptions of these chips are provided in publications entitled *Cache & as DRAM Controller (CDC) 82424TX* and *Data Path Unit (DPU) 82423TX*, each published by Intel Corporation.

The bridge 14 includes circuitry for interfacing the CPU 11 and main memory 13 to the bridge 14, circuitry for interfacing the bridge 14 to the PCI bus 12 as either a bus master or a bus slave, and cache control and data synchronization circuitry. In general, the bridge circuit 14 includes circuitry for controlling and accomplishing the transfer of data among the CPU 11, main memory 13, and the PCI bus 12. Among the circuitry included in the bridge 14 and specifically in the DPU are a number of buffer memory circuits in which data may be stored during transfer among the CPU 11, main memory 13, and the PCI bus 12. For example, write buffers in the DPU allow the CPU 11 to store data being transferred to the PCI bus 12 and continue with other operations while the bridge circuit 14 completes the transfer of the write data to the slower PCI bus 12. This greatly improves the speed of data transfer in the computer system 10 when using a high speed central processing unit. The write buffers included within the bridge 14 may advantageously utilize the present invention.

Also connected to the PCI bus 12 is a PCI bus master circuit 16 which may be one of a number of different components. From a bus standpoint, the main properties of a PCI bus master are that it includes a microprocessor or controller which functions at some internal clock rate and that it may initiate and control operations on the PCI bus 12, Also connected to the PCI bus 12 is a PCI slave circuit 23 which may be a circuit such as a video output card having a frame buffer adapted to store video signals to be transferred to an output device such as a monitor for display.

Also connected to the PCI bus 12 is a PCI/secondary bus bridge circuit 17. The bridge circuit 17 performs the various functions necessary to transfer data between the PCI bus 12 and various component circuits joined to a secondary bus 18. The secondary bus 18 may be an ISA bus, an EISA bus, or a similar bus, any of which typically transfers data at a rate slower than the bus 12. One specific PCI to secondary bridge circuit 17 used with an EISA secondary bus includes a pair of integrated circuit chips referred to respectively as a PCI/EISA bridge (PCEB) 24 and an EISA System Controller (ESC) 25. These integrated circuit chips are manufactured by Intel Corporation and are described in detail in the publication entitled 82420/82430 *PCIset, ISA and EISA Bridges*, referred to above. In general, the PCEB chip 24 includes circuitry for transferring data between the two buses, while the ESC chip 25 includes circuitry for controlling access to the secondary bus.

Such a bridge 17 includes circuitry for providing the interface between the PCI bus 12 and the secondary bus 18 so that data may be transferred therebetween. Among this circuitry are a number of data buffers adapted to store data being transferred between the two buses. The buffers included within the bridge 17 may advantageously utilize the present invention. To facilitate the data transfer, the bridge 17 provides circuitry generally in the PCEB chip 24 which allows it to operate as an intercoupling bus master or a bus slave on the PCI bus 12. The bridge 17 also provides circuitry generally in the ESC chip 25 which allows it to operate as an bus master or a bus slave on the secondary bus 18. The ability of the bridge 17 to act as a PCI bus master and a secondary bus slave allows a bus master circuit 19 positioned on the secondary bus 18 (for example, local area network circuitry) to gain access to the PCI bus 12 and thence to the main memory. The bridge 17 may also include a first arbiter circuit for controlling access to the PCI bus 12 and a second arbiter circuit for controlling access to the secondary bus 18.

Referring now to FIG. 2, there is illustrated a block diagram of a data transfer portion in one embodiment of a bridge circuit 17 such as that illustrated in FIG. 1 which is designed in accordance with the present invention to accomplish the transfer of data between the two buses 12 and 18 of the computer system. The data transfer circuitry of the circuit 17 includes three individual paths which may transfer data between the PCI bus 12 and a secondary bus 18. The first of these three paths 30 includes a line buffer 33 (a plurality of individual buffers in one embodiment) in which data may be stored which is being transferred during read and write operations. Typically data is stored in this buffer when a read transfer is being accomplished from the faster to the slower bus, i.e., when the slower secondary bus is reading from the PCI bus to the secondary bus or when a write operation is being accomplished from the slower to the faster bus. The second path 31 includes a posted write buffer 37 in which data being written from the faster to the slower bus is typically stored. The third path is essentially a direct connection 32 for information which need not (or may not) be stored during transfer between the buses. This third path 32 allows data to be taken directly from memory and transferred to the secondary bus without buffering.

Each of these three paths is connected to receive input data transferred by a multiplexor 34. The multiplexor 34 is represented by a pair of tristate devices 38 and 39 which may be enabled to allow input from either of the buses. The multiplexor 34 receives input signals from input latches 35 and 36 connecting to each of the two buses 12 and 18 under control of enabling signals furnished when a particular bus master gains access to the bus and the bridge circuitry. Only one of the two buses may transfer signals at any instant. Consequently, only one of the inputs to the multiplexor 34 from the latches will be selected at any time. Each of the three paths is also connected to provide outputs to a pair of output buffer circuits 40 and 41 which, may be enabled to transfer the data to either the secondary bus 18 or the PCI bus 12. Consequently, data may be sent from either the PCI bus or the secondary bus to the other one of the two buses through any of the paths without any significant clock delays in the transfer.

As may be seen, each of the three paths includes a tristate device 43, 44, or 45 which when enabled allows the transfer data through that particular path from the sending bus to the receiving bus. Each of the two paths which includes storage buffers 33 or 37 also includes circuitry for furnishing control signals to enable that buffer so that the correct storage buffer and path may be selected for the particular read and write operation which is taking place. Included among these control signals are write pulses which may be provided in accordance with the present invention.

FIG. 3 illustrates in block diagram form a prior art method of generating write signals at the same rate as the clock signals. As may be seen, a circuit 50 includes a NAND gate 52. The clock signals and write enable signals are furnished to the NAND gate 52. As may be seen from the timing diagram of FIG. 4, when the enable pulse (WriteEnable1) is correctly timed with respect to the clock pulses, this produces a series of write pulses ($\overline{\text{Write1}}$) of a form and period equal to the clock pulses but opposite in phase. These write pulses (Write1) may be used to write data to the buffers utilized in the bridges 14 and 17 of the computer system illustrated in FIG. 1. However, the generation of write pulses depends on the simultaneous presence of both the clock and the write enable signals. Consequently, when using the circuit 50, the write enable signals must be very carefully generated and controlled to appear at exactly the correct instant in relation to the clock pulses. Typically, this is controlled by balancing the circuit parameters for the expected circuit characteristics and operating parameters. If the write enable signals (e.g., WriteEnable2) appear too soon or too late, then it is possible to generate false write pulses (Write2) which are capable of writing data at a time when that data may be invalid or to violate the minimum pulse width requirement for guaranteeing that a write occurs. As may be seen in FIG. 4, if these false write pulses (Write2) appear while data being furnished is invalid, then that invalid data may be incorrectly written to the data buffers. Moreover, an inappropriately timed write enable signal (WriteEnable2) may generate write pulses too short to guarantee that valid data is correctly written into the data buffer. Typically, delay elements such as the element 53 are placed in circuit with the clock pulses or the write enable signals in order to balance the timing of the signals at the normal operating temperature and other operating parameters of the circuitry produced by the normal manufacturing process. Even though adding such delay elements may provide a solution at particular operating parameters for circuits produced by the normal manufacturing process, it does not resolve the problem across a range of operating conditions and processes.

FIG. 5 illustrates in block. diagram form a circuit 60 designed to produce write signals which may be utilized for writing data being transferred from one of the buses 12 or 18 to the other of the buses. The circuit 60 includes a first D flip-flop 61 and a second D flip-flop 62. As is well known, such a flip-flop clocks whatever signal appears at its D input terminal to a Q output terminal and the inverse of that signal to its Q# output terminal (where "#" designates the inversion). The flip-flop 61 receives an input signal at its D input terminal from the output of a multiplexor 63. The flip-flop 62 receives an input signal at its D input terminal from the output of a multiplexor 64. The signal at the Q output terminal of the flip-flop 61 is fed back and furnished as one input signal to the multiplexor 63. The inverted signal at the Q# output terminal of the flip-flop 61 is fed back and furnished as another input signal to the multiplexor 63. Similarly, the signal at the Q output terminal of the flipflop 62 is fed back and furnished as one input signal to the multiplexor 64, while the inverted signal at the Q# output terminal of the flip-flop 62 is fed back and furnished as another input signal to the multiplexor 64. The signal at the Q output terminal of the flip-flop 61 and the signal at the Q# output terminal of the flip-flop 62 are furnished as input signals to an exclusive OR (XOR) gate 65. An XOR gate produces a one valued output signal when both of the input signals furnished are of opposite polarity and a zero valued output signal when both of the input signals furnished are of the same polarity. As will be seen, the XOR gate 65 provides the write signals which are desired from the present invention.

The multiplexor 63 receives a write enable signal which causes one of the two signals furnished at its input to be transferred to the D input terminal of the flip-flop 61. If the write enable signal is low, then the value on the A input terminal is transferred to the output terminal of the multiplexor 63. The write enable signal is also transferred to the D input terminal of another flip-flop 67. Each of the flip-flops 61 and 67 receive clock signals at a clock input terminal while the flip-flop 62 receives inverted clock signals at a clock input terminal. The signal at the Q output terminal of the flip-flop 67 is used to enable the multiplexor 64. The signal at the Q output terminal of the flip-flop 67 lags the write enable signal by the time necessary for the clock to go high to transfer the value at the D input terminal to the Q output terminal of the flip-flop 67.

When the system is initialized, each of the flip-flops 61 and 62 is placed in the same condition. Therefore, the two signals furnished at the Q output terminal of the flip-flop 61 and the Q# output terminal of the flipflop 62 are opposite in value. This causes the output of the exclusive OR (XOR) gate 65 to be high. A high valued output from the XOR gate 65 is considered to be a zero output signal in the present discussion (i.e., it does not write data to buffer memory). Each of the flip-flops is receiving clock pulses at its clock input terminal. With a low valued write enable signal, the two flip-flops 61 and 67 transfer to their Q output terminals whatever signal appears at the D input terminal when such clock pulses are received, while the flip-flop 62 transfers to its Q output terminal whatever signal appears at its D input terminal when the inverted half of such clock pulses are received. Prior to the receipt of any write enable signal (while the write enable signal is low), the same signal will appear at the D input terminal of the flip-flop 61 since the multiplexor 63 will be passing the same signal (the value at the Q output terminal) so long as the write enable signal remains low. Presuming that the flip-flop 61 is initially in the state at which a low valued signal is provided at its Q output terminal, the low valued signal at the Q terminal is being furnished to the A input terminal of the multiplexor 63 and to the D input terminal of the flip-flop 61. Thus, the value at the Q output terminal remains low. Similarly, prior to the receipt of any write enable signal (while the write enable signal is low), the same low valued signal will appear at the D input terminal of the flip-flop 62 since the multiplexor 64 will be passing the same signal from its A input terminal so long as the write enable signal remains low. With the flip-flop 61 initially in the state at which a low valued signal is provided at its Q output terminal, when a high valued write enable signal is received, the high valued output furnished at the Q# output terminal of flip-flop 61 is applied to the D input terminal. This signal is clocked to the Q output terminal when the clock rises to a high value. Similarly, if the flip-flop 62 is initially providing a low value at its Q output terminal, then the high valued signal initially appearing at its Q# output terminal is being applied is transferred to the output terminal Q. However since the write enable signal must be clocked through the flip-flop 67, the high valued signal appears to enable the multiplexor only when the clock pulse goes high. Moreover, the input at the D input terminal of the flip-flop 62 is not clocked to the Q output terminal until the clock pulse goes low. Thus the high valued input signal (from the Q# output terminal of flip-flop 62) at the D input terminal of the flip-flop 62 is clocked to the Q output terminal one-half clock period later than the high valued input signal (from the Q# output terminal of flip-flop 61) is clocked to the Q output of the flip-flop 61.

The signal at the Q output of the flip-flop 61 rises to a high value in response to the rising clock signal. The signals applied to the input of the multiplexor 63 are thus reversed as the flip-flop 61 switches state. Consequently, the signal at the input to the D terminal reverses to a low value. However since the clock goes low during the second half of the clock period, the low value is not clocked to the Q output terminal.

Thus, the Q output terminal of flip-flop 61 remains high for an entire clock period. When the clock signal again goes high, the low value at the D input terminal to the flip-flop 61 is clocked to the Q output terminal causing the toggle 1 signal to switch to the low state. The flip-flop 61 continues to function in this manner so long as the write enable signal stays high.

Simultaneously, but delayed by one-half of a clock period, the flip-flop 62 produces the same pattern of operation. Since the signal provided from the output of the multiplexor 64 to the D input terminal of the flip-flop 62 is clocked to the Q output terminal of the flip-flop 62 in response to an inverted clock, the output produced at the output terminals of the flip-flop 62 and provided to the XOR gate 65 continues to lag the output of the flip-flop 61 by one-half a clock period. As may be seen from the timing diagram of FIG. 3, this causes the XOR gate 65 to provide write pulses exactly equal to the clock pulses but of opposite phase during any period in which the write enable signal is furnished.

The circuit produces these write output pulses over any range of temperatures and operating conditions and with circuitry manufactured by any variation in process. The timing of the output signals is entirely controlled by the output of the flip-flops 61, 62, and 67. The timing of the output signals generated by the individual flip-flops is entirely dependent on the length of the clock during any period in which a write enable signal is present. Thus, the circuit requires no balancing of delay elements in order to function at particular operational conditions. Since no delay elements need to be built into the circuit in order to tune the circuit so that the clock and write enable signals appear in the proper order, no false or shortened write signals can be generated from which invalid data might be written into the buffers of the bridge circuit 17 of the system illustrated in FIG. 1.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. An apparatus for generating a write pulse signal, comprising:
   a first flip flop providing a first flip flop output signal in response to a clock signal and a first flip flop input signal;
   a first multiplexor for selecting the first flip flop input signal from one of the first flip flop output signal and a complement of the first flip flop output signal in response to a write enable signal;
   a second flip flop providing a second flip flop output signal in response to a complement of the clock signal and a second flip flop input signal;
   a second multiplexor for selecting the second flip flop input signal from one of the second flip flop output signal and a complement of the second flip flop output signal in response to a control signal;
   a third flip flop providing the control signal in response to the clock signal and the write enable signal; and
   a logic gate generating the write pulse signal from the first flip flop output signal and the complement of the second flip flop output signal.

2. The apparatus of claim 1 wherein at least one of the first, second, and third flip flops is a D flip flop.

3. The apparatus of claim 1 wherein the logic gate is an exclusive OR gate.

4. A computer system comprising:
   a processor;
   a main memory;
   a first bus associated with the processor and main memory;
   a second bus;
   a bridge circuit having a plurality of buffers for storing information being transferred between the first and second bus; and
   a write pulse signal generator for controlling writing to the plurality of buffers comprising:
   a first flip flop providing a first flip flop output signal in response to a clock signal and a first flip flop input signal;
   a first multiplexor for selecting the first flip flop input signal from one of the first flip flop output signal and a complement of the first flip flop output signal in response to a write enable signal;
   a second flip flop providing a second flip flop output signal in response to a complement of the clock signal and a second flip flop input signal;
   a second multiplexor for selecting the second flip flop input signal from one of the second flip flop output signal and a complement of the second flip flop output signal in response to a control signal;
   a third flip flop providing the control signal in response to the clock signal and the write enable signal; and
   a logic gate generating the write pulse signal from the first flip flop output signal and the complement of the second flip flop output signal.

5. The apparatus of claim 4 wherein at least one of the first, second, and third flip flops is a D flip flop.

6. The apparatus of claim 4 wherein the logic gate is an exclusive OR gate.

7. An apparatus for generating a write pulse signal, comprising:
   a first flip flop providing a first flip flop output signal in response to a clock signal and a first flip flop input signal;
   a first multiplexor for selecting the first flip flop input signal from one of the first flip flop output signal and a complement of the first flip flop output signal in response to a write enable signal;
   a second flip flop providing a second flip flop output signal in response to a delayed clock signal and a second flip flop input signal;
   a second multiplexor for selecting the second flip flop input signal from one of the second flip flop output signal and a complement of the second flip flop output signal in response to a control signal;
   a third flip flop providing the control signal in response to the clock signal and the write enable signal; and
   a logic gate generating the write pulse signal from the first flip flop output signal and the complement of the second flip flop output signal.

8. The apparatus of claim 7 wherein the delayed clock signal is an inverted clock signal.

9. The apparatus of claim 7 wherein the delayed clock signal is the clock signal delayed by approximately one-half of a period of a clock cycle.

10. The apparatus of claim 7 wherein at least one of the first, second, and third flip flops is a D flip flop.

11. The apparatus of claim 7 wherein the logic gate is an exclusive OR gate.

12. A computer system comprising:

a processor;

a main memory;

a first bus associated with the processor and main memory;

a second bus;

a bridge circuit having a plurality of buffers for storing information being transferred between the first and second bus; and a write pulse signal generator for controlling writing to the plurality of buffers comprising:

- a first flip flop providing a first flip flop output signal in response to a clock signal and a first flip flop input signal;
- a first multiplexor for selecting the first flip flop input signal from one of the first flip flop output signal and a complement of the first flip flop output signal in response to a write enable signal;
- a second flip flop providing a second flip flop output signal in response to a delayed clock signal and a second flip flop input signal;
- a second multiplexor for selecting the second flip flop input signal from one of the second flip flop output signal and a complement of the second flip flop output signal in response to a control signal;
- a third flip flop providing the control signal in response to the clock signal and the write enable signal; and
- a logic gate generating the write pulse signal from the first flip flop output signal and the complement of the second flip flop output signal.

13. The apparatus of claim 12 wherein the delayed clock signal is an inverted clock signal.

14. The apparatus of claim 12 wherein the delayed clock signal is the clock signal delayed by approximately one-half of a clock signal period.

15. The apparatus of claim 12 wherein at least one of the first, second, and third flip flops is a D flip flop.

16. The apparatus of claim 12 wherein the logic gate is an exclusive OR gate.

* * * * *

UNITED STATES PATENT AND TRADEMARK OFFICE
CERTIFICATE OF CORRECTION

PATENT NO.   : 5,535,343
DATED        : July 9, 1996
INVENTOR(S)  : Jerry Verseput It is certified that error appears in the above-identified patent and that said Letters Patent is hereby corrected as shown below:

In column 3 at line 6 delete "*as*"

In column 3 at line 33 delete "PCI bus 12," and insert --PCI bus 12.--

In column 3 at line 51 delete "generai," and insert --general,--

In column 5 at lne 32 delete "block. diagram" and insert --block diagram--

In column 7 at line 15 delete "one-haif" and insert --one-half--

In column 7 at line 24 delete "signais" and insert --signals--

Signed and Sealed this

Fourteenth Day of January, 1997

Attest:

BRUCE LEHMAN

Attesting Officer

Commissioner of Patents and Trademarks